April 9, 1929.   L. L. RECKLER   1,708,153
LIQUID CONTROL MEANS FOR HYDRAULIC BRAKES
Filed Oct. 20, 1926
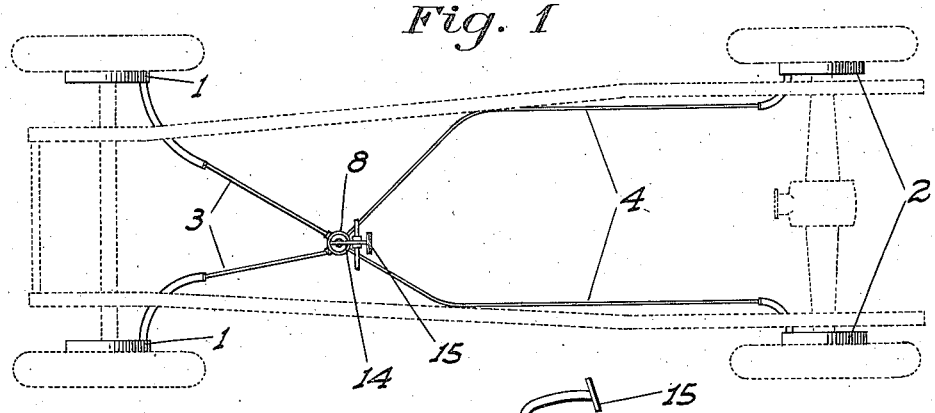
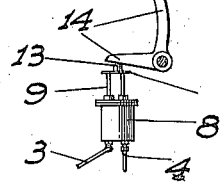
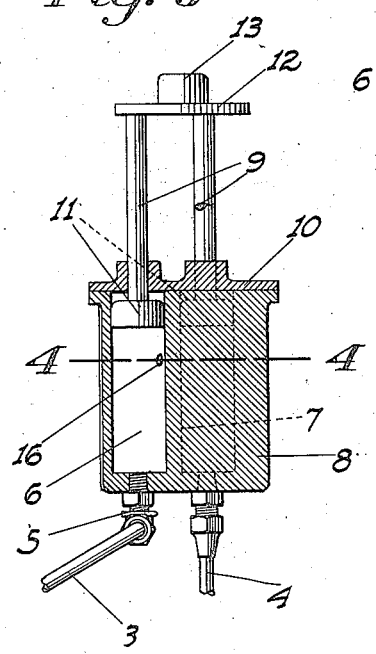
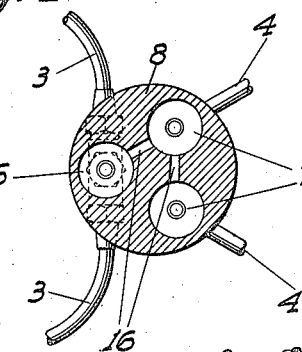
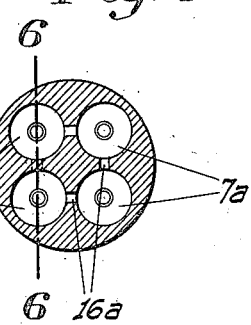
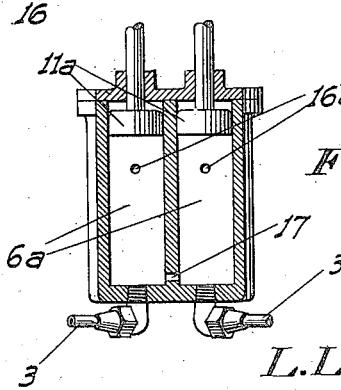
INVENTOR.
L. L. Reckler
BY
ATTORNEY Patented Apr. 9, 1929.

1,708,153

UNITED STATES PATENT OFFICE.

LAURENCE L. RECKLER, OF WESTWOOD, CALIFORNIA.

LIQUID-CONTROL MEANS FOR HYDRAULIC BRAKES.

Application filed October 20, 1926. Serial No. 142,817.

This invention relates to improvements in liquid control means for four wheel hydraulic brakes such as are applied to motor vehicles, and particularly represents an improvement over the structure shown in my co-pending application for patent, Serial No. 68,320 filed November 11th, 1925.

The former mechanism was so devised as to cause the liquid to be normally equalized to all four brakes and to enable the braking pressure to be applied to any three out of the four brakes in the event that a leak developed in the liquid line of the other brake. This construction represented a considerable improvement over braking systems now in use in which a leak in the line to one brake causes all the other brakes to be rendered inoperative. This very feature, however, also proved a source of danger, since if a leak should happen to develop in the line to one of the front brakes, the other front brake could still be applied and this would cause an immediate slewing around of the wheels if an intensely tight grip was not maintained on the steering wheel, and even this would probably not entirely eliminate the swerving of the car.

The principal object of the present invention therefore is to eliminate the above defective feature by arranging the control apparatus so that if one front brake should be rendered inoperative by a leak in the oil line, the other front brake would likewise and automatically be rendered inoperative. At the same time the rear brakes remain operative so that the braking power even then would be equal to that obtained on ordinary two brake cars. The liquid equalizing feature is retained and normally functions to equalize the liquid to all the four brakes, and is not affected by the first mentioned feature of the apparatus.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a plan outline of a motor vehicle showing a four-wheel brake structure thereon with my improved form of fluid control means applied thereto.

Fig. 2 is a fragmentary side elevation showing a pedal control mechanism for the operating plungers.

Fig. 3 is a sectional elevation of the preferred form of cylinder and plunger unit detached.

Fig. 4 is a cross section on the line 4—4 of Fig. 3.

Fig. 5 is a cross section of a modified form of cyilnder unit.

Fig. 6 is a vertical section on the line 6—6 of Fig. 5.

Referring now more particularly to the characters of reference on the drawings, and particularly at present to Figs. 1 to 4, 1 denotes the front wheel brake units of a motor vehicle, and 2 the rear wheel brake units thereof. The particular form of brake mechanism forms no part of my invention, but in any case each such unit has a pipe for the liquid, usually oil, leading therefrom. In the drawings 3 denotes the pipes from the front brakes and 4 the pipes from the rear brakes. The pipes 3 converge to a fitting 5 which is mounted in and communicates with the bottom of a vertical cylinder 6. The pipes 4 lead individually to a separate pair of other vertical cylinders 7, which are formed in unitary association with the cylinder 6 in a block 8. The cylinders and pipes of the system are intended to be maintained entirely full of oil, as is customary.

Rods 9 are slidable through the top cap 10 of the cylinder block with plungers 11 of leather or the like on their inner ends impinging snugly against the walls of the cylinders. The rods outwardly of the cap are rigidly connected to a single head 12 having a stem 13 projecting upwardly therefrom. This stem is adapted to be engaged by the lower end of a lever 14 of suitable form, having a foot pad 15 on its upper end. This lever as usual with hydraulic brakes, takes the place of the ordinary service brake foot lever.

Intermediate the upper and lower limits of movement of the plungers, small passages 16 provide communication between the different cylinders. In operation therefore the oil level in the different cylinders will normally always be the same, insuring a fully equalized operation of the brakes, as in the previous structure.

If a leak should develop in either of the pipes 4 or in the mechanism associated therewith the oil will of course be drained from the corresponding cylinder. The oil will also be drained to a certain extent from the other cylinders, but only to the level of the passages 16. This will then still permit one of the rear brakes and the two front brakes being applied. If, however, a leak should develop in either of the pipes 3 the corresponding cylinder 6 will be entirely drained, and even though the other pipe 3 itself should remain full of oil, the downward movement of the plungers in said cylinder will of course impart no pressure to such oil. Both the front wheel brakes will therefore be rendered inoperative and the dangerous swerving of the vehicle due to uneven front brake application is avoided.

Referring now to Figs. 5 and 6, the same results may be obtained by using a pair of cylinders 6ᵃ for the front brakes with individual plungers 11ᵃ therein, in addition to the cylinders 7ᵃ for the rear brakes. In this case the pipes 3 to the front brakes are connected individually to the cylinders 6ᵃ. To cause the draining of both cylinders 6ᵃ to take place if a leak to one of the front brakes should develop, said cylinders 6ᵃ have an inter-communicating passage 17 at the bottom, independent of the upper equalizing passages 16ᵃ. By this means the same results are obtained as was the case with the first described type, as will be evident.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A liquid control structure for four-wheel hydraulic brakes comprising with pipes leading from the individual brakes, a member having cylinders to the bottoms of which the pipes are individually connected, plungers in the cylinders, means for depressing the plungers simultaneously, and means whereby if the liquid drains out from one front-wheel brake pipe no pressure will be imparted to the liquid in the other front-wheel brake pipe upon depressing the plungers without interfering with the imparting of pressure to the brake pipes of the other cylinders and brakes.

2. A liquid control structure for four-wheel hydraulic brakes comprising with pipes leading from the individual brakes, a member having cylinders to the bottoms of which the pipes are individually connected, plungers in the cylinders, and means for depressing the plungers simultaneously; the cylinders to which the front-wheel brake pipes are connected having a communicating passage therebetween adjacent the bottom thereof.

In testimony whereof I affix my signature.

LAURENCE L. RECKLER.